UNITED STATES PATENT OFFICE.

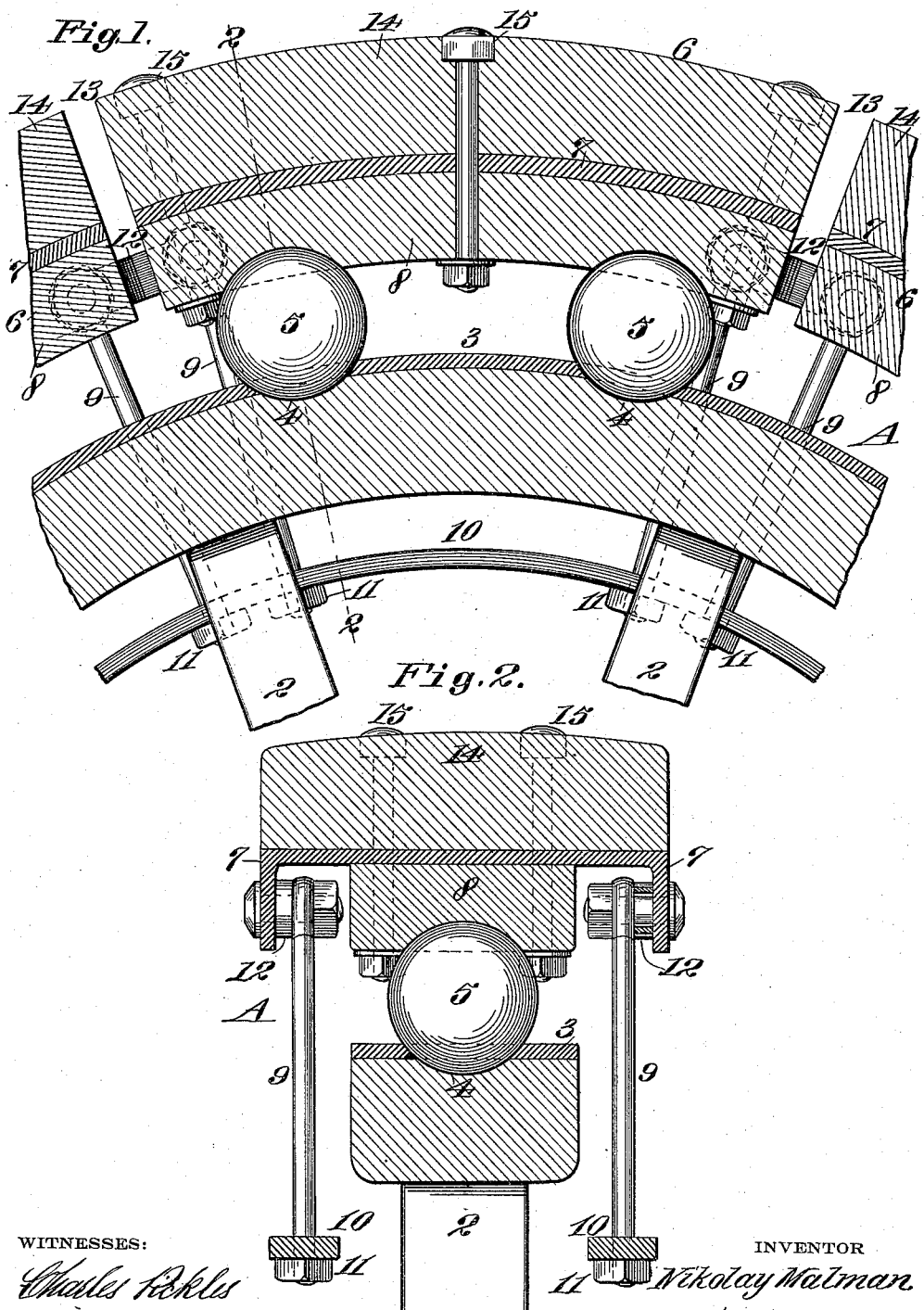

NIKOLAY MALMAN, OF SAN FRANCISCO, CALIFORNIA.

RESILIENT TIRE.

1,162,090.  Specification of Letters Patent. Patented Nov. 30, 1915.

Application filed April 13, 1915. Serial No. 21,053.

*To all whom it may concern:*

Be it known that I, NIKOLAY MALMAN, a citizen of the United States, residing in the city and county of San Francisco and State of California, have invented new and useful Improvements in Resilient Tires, of which the following is a specification.

This invention relates to a resilient tire.

One of the objects of the present invention is to provide a simple, substantial, cheaply manufactured, puncture-proof resilient tire which is so constructed that it may be applied to any standard wheel now in use.

Another object of the invention is to provide a tire of the character described which is sectional in construction, thereby producing a shoelike tread having a great tractive efficiency and resiliency.

Further objects will hereinafter appear.

The invention consists of the parts and the construction and combination of parts as hereinafter more fully described and claimed, having reference to the accompanying drawings, in which—

Figure 1 is a partial side elevation in section. Fig. 2 is a cross section on line 2—2, Fig. 1.

A indicates the ordinary felly of a wheel and 2 the spokes. Surrounding the exterior face of the felly is a continuous steel band or ring 3, and formed in the face of said band and felly is a plurality of pockets 4 which act as seats or receptacles for cushion members, such as indicated at 5. These cushion members are spherical and preferably constructed of rubber.

Mounted exteriorly of the felly and seating on the cushion members 5 are shoes 6. There may be any suitable number of these shoes around the exterior of the felly. Each shoe consists of a flanged metal member 7, interiorly of which is secured a wooden block 8. This block is provided with seats similar to those formed in the felly at 4. The cushion members are thus locked in position between the shoes and felly. The shoes are otherwise connected to the felly by means of inwardly extending links 9, the inner ends of which are secured in rings 10 by means of nuts 11. The shoes 7 are connected by links 12, and are preferably spaced apart lengthwise a suitable distance, and this distance is always kept by the spacing links 12. Each shoe 7 may be provided with a rubber facing or tire section 14 which is secured thereto by bolts 15, or other means. A resilient tire is in this manner provided for the wheel, said tire consisting of a plurality of shoes 6 resiliently mounted on rubber cushion members 5. Each shoe is furthermore, movable or yieldable independently of the adjacent shoes, and a flexible chain-like structure is at the same time provided which is held in position on the felly by means of rings 10 and bolts 9.

A tire constructed as here shown does not only have great resiliency and durability but also great tractional force, this being produced by the shoe-like tread and the independent yielding action of each shoe. The heads on the bolts 15 are preferably allowed to extend a slight distance beyond the face of the tire sections, thus increasing the tractive efficiency and preventing skidding action.

The materials and finish of the several parts of the tire are such as the experience and judgment of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. In combination with a wheel, a series of shoes encircling the wheel felly, cushioning means between the respective shoes and felly, each shoe being composed of an inner and an outer member and a metal plate interposed between said members and secured thereto, said plates having a flange at each side thereof which flanges extend toward the wheel hub and are spaced from the sides of the inner members of the shoes, rings on opposite sides of the wheel, and radial links connected to the rings and to the respective ends of the flanges of the metal plates and arranged in the space between said flanges and the sides of the inner members of the shoes and crossing the felly in spaced relation to the sides thereof.

2. In combination with a wheel, a series of shoes encircling the wheel felly, said shoes including inner and outer members and a plate interposed between said members and secured thereto, said plates having a flange at each side thereof which flanges extend toward the wheel hub and are spaced from the sides of the inner shoe members, cushioning means between the wheel felly and the inner shoe members, and securing means for the shoes including members secured to the flanges of the plates and disposed between the flanges and the sides of the inner shoe members.

In testimony whereof I have hereunto set my hand in the presence of two subscribing witnesses.

NIKOLAY MALMAN.

Witnesses:
F. R. WEBB,
KARL E. ANDERSON.

Copies of this patent may be obtained for five cents each, by addressing the "Commissioner of Patents, Washington, D. C."